July 27, 1948.

H. E. MATTICE 2,446,094

SUPERCHARGING AND SCAVENGING INTERNAL-COMBUSTION ENGINE

Filed July 5, 1944

Inventor

HAROLD E. MATTICE,

By Clarence A. O'Brien
and Harvey B. Jacobson
Attorneys

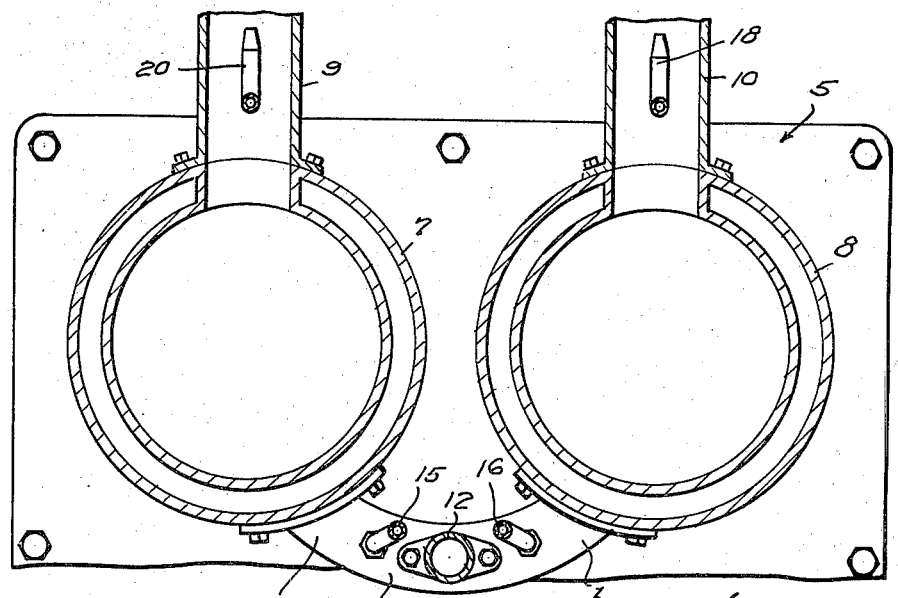
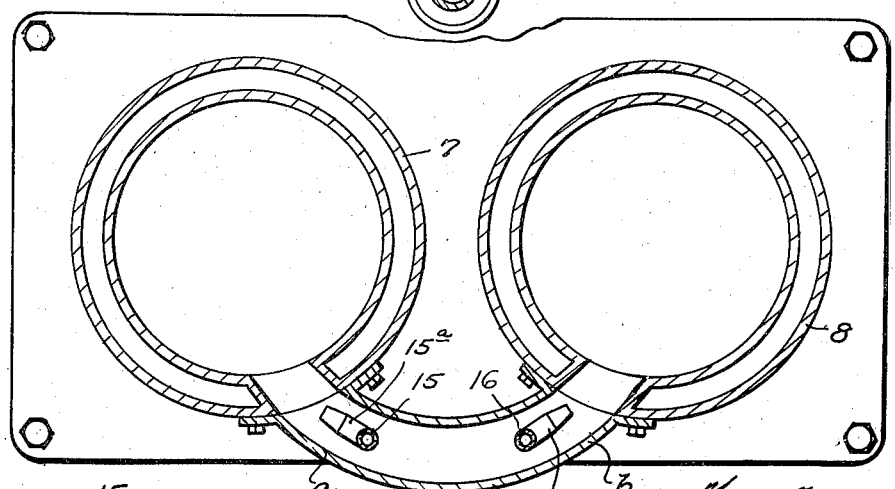
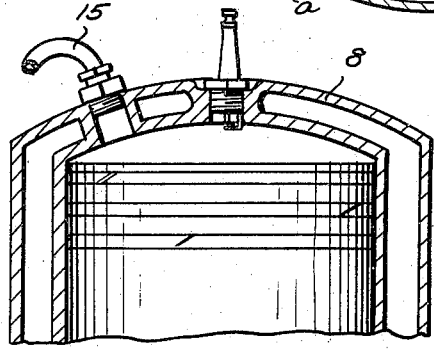

Patented July 27, 1948

2,446,094

UNITED STATES PATENT OFFICE 2,446,094

SUPERCHARGING AND SCAVENGING INTERNAL-COMBUSTION ENGINE

Harold E. Mattice, Eureka, Calif.

Application July 5, 1944, Serial No. 543,570

6 Claims. (Cl. 123—119)

This invention relates to new and useful improvements in a method and apparatus for supercharging and scavenging internal combustion engines preferably of the two cycle type in a simple and expeditious manner.

The principal object of the present invention is to provide a method whereby some of the products of combustion are utilized from one cylinder to another for the purpose of supercharging the latter and wherein some of the products of combustion are used from one cylinder of an engine to another for the purpose of expediting the exhaust burned gases.

Another important object of the invention is to provide unusually simple structural improvements on conventional internal combustion engines to accomplish the purposes stated.

Other objects and advantages of the invention will become apparent to the reader of the following description.

In the drawings:

Figure 3 is a horizontal sectional view taken on the line 3—3 of Figure 2.

Figure 4 is a horizontal sectional view taken on the line 4—4 of Figure 2.

Figure 5 is a fragmentary vertical sectional view through one of the cylinders.

Figures 1, 2:
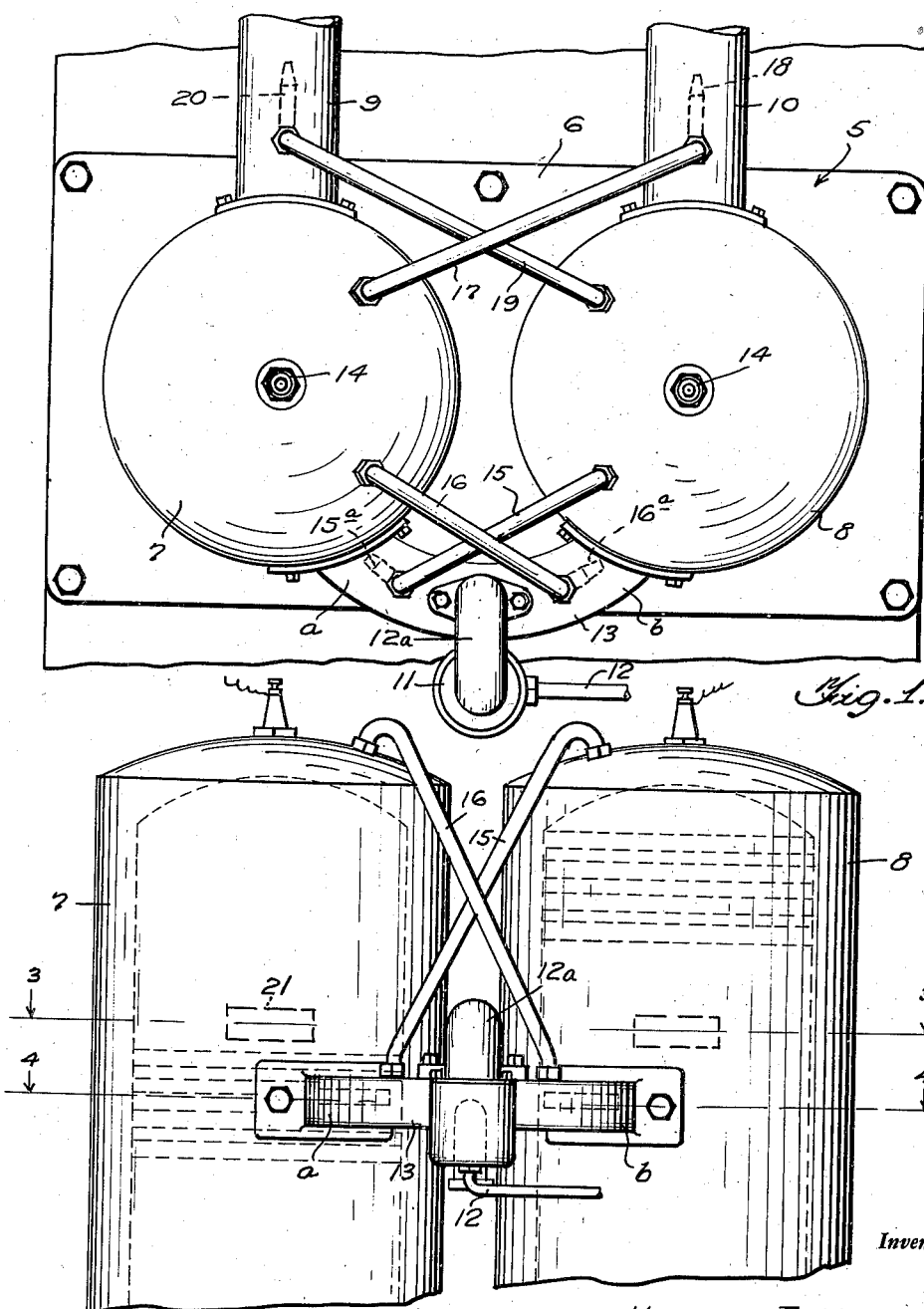
Figure 1 represents a fragmentary top plan view of a two-cycle engine showing the improvements installed.
Figure 2 is a fragmentary side elevational view of the structure shown in Figure 1.

Referring to the drawings wherein like numerals designate like parts, it can be seen that numeral 5 denotes generally a two-cycle valveless type engine.

The engine 5 briefly consists of a crankcase 6, cylinders 7, 8, exhaust pipes 9, 10 for the cylinders, a carburetor 11 having a fuel pipe 12 connected to a horizontally disposed manifold 13, the pipe 12ª connecting to the manifold 13 at the intermediate portion of the latter. Thus the manifold 13 has a portion $a$ leading to the cylinder 7 and a portion $b$ leading to the cylinder 8. Each cylinder has a spark plug 14.

In carrying out the present invention, a tube 15 extends from the head of the cylinder 8 to the portion $a$ of the manifold 13 leading to the cylinder 7. A second tube 16 extends from the head of the cylinder 7 to the portion $b$ of the intake manifold 13.

A tube 17 extends from the head of the cylinder 7 into the exhaust pipe 10 of the cylinder 8, where it is provided with a jet 18. A tube 19 extends from the head of the cylinder 8 and into the exhaust pipe 9 of the cylinder 7 where it is provided with a jet 20.

Jets 15a, 16a are provided on the intake manifold ends of the tubes 15, 16.

In the operation of the apparatus, as the piston in the cylinder 8 moves up against compression, the piston in the cylinder 7 uncovers first the exhaust port 21 of its cylinder, then the fuel inlet port at the manifold 13, some gases from cylinder 8 being forced into the tube 15.

When combustion occurs in the cylinder 8 and the pressure rises, more gases are jammed into the tube 15. As these gases are rushed from the jets 15a into the manifold portion $a$ and then into the cylinder 7 at high velocity, they push what other gases surround them through the inlet port and into the cylinder 7, filling the cylinder with an atomized mixture of fuel from carburetor 11. This mixture then contains some burned gases which slow up combustion, preventing detonation or ping, makes it possible to use a higher compression ratio. On the next stroke the piston in the cylinder 7 compresses the charge and forces some gases into the tube 16 which, in turn, supercharges fuel into the cylinder 8, completing the cycle.

Obviously, the tubes 17 and 19 function in substantially the same manner, but with the result that the exhaust burned gases through the exhaust pipes 9 and 10 are expedited by the impulse of the pressure of gases delivered by the jets 18, 20 thereby producing a desirable scavenging effect.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An arrangement for supercharging internal combustion engines with a plurality of cylinders operating with a phase difference, each cylinder being provided with a cylinder head closing the combustion space of the said cylinder, and further provided with inlet and exhaust openings, a reciprocating piston, a fuel manifold for charging said cylinder, and an exhaust manifold, the reciprocating piston of one of the cylinders being in position for its suction phase when the piston of another cylinder is in position for the combustion phase, means for conducting the gases under the pressure produced during combustion in one cylinder to the intake manifold of the cylinder starting its suction stroke and means arranged in the said intake manifold for converting the pressure of said gases into the velocity of a jet and for accelerating and entraining the fuel in said manifold while flowing from the manifold into said cylinder.

2. An arrangement for supercharging internal combustion engines with a plurality of cylinders operating with a phase difference, each cylinder being provided with a cylinder head closing the combustion space of the said cylinder, and further provided with inlet and exhaust openings, a reciprocating piston, a fuel manifold for charging said cylinder and an exhaust manifold, the reciprocating piston of one of the cylinders being in position for its suction phase, when the piston of another cylinder is in position for the combustion phase, a pressure conduit leading from the cylinder head of each cylinder to the fuel manifold of another cylinder for conducting gases under combustion pressure from the first-named cylinder when in the combustion phase to the last-named cylinder when in its suction phase, a nozzle in said fuel manifold connected with the said pressure conduit for converting the pressure of the gases into velocity and for producing a jet, said nozzle being arranged to direct its jet into the fuel mixture and towards the inlet opening of the cylinder.

3. An arrangement for supercharging internal combustion engines with a plurality of cylinders operating in phase related pairs, each cylinder being provided with a cylinder head closing the combustion space of the said cylinder, and further provided with inlet and exhaust openings, a reciprocating piston, a fuel manifold for charging said cylinder and an exhaust manifold, the reciprocating piston of one of the cylinders in a phase related pair being in its exhaust and suction phase when the piston of another cylinder is near the end of its compression phase, and vice versa, direct pressure fluid communication pipes leading from the cylinder head of each cylinder of the phase related pair into the exhaust manifold of the other cylinder of said pair and nozzle means, converting pressure into velocity at the end of the pipes located within the exhaust manifolds for accelerating and entraining the exhaust gases.

4. An arrangement for supercharging and for accelerating the flow of gases into and out of the cylinders of internal combustion engines with a plurality of cylinders operating at a phase difference, each cylinder being provided with a cylinder head closing the combustion space of the cylinder and with intake and exhaust openings, a reciprocating piston within each cylinder, a fuel manifold and an exhaust manifold, connection pipes leading from the cylinder head of one cylinder to the fuel manifold of another cylinder, connection pipes leading from the cylinder head of the first named cylinder to the exhaust manifold of the last-named cylinder, and nozzles arranged at the end of both connection pipes, said nozzles being so directed as to accelerate the flow of the gases.

5. An arrangement for supercharging and for accelerating the flow of gases into and out of a two cycle two cylinder combustion engine, with cylinders operating at a phase difference, each cylinder being provided with intake and exhaust openings and with a cylinder head closing the combustion chamber, a reciprocating piston in each of said cylinders, intake and exhaust ducts associated with said intake and exhaust openings, two connection pipes leading from the head of each cylinder to the intake duct and to the exhaust duct of the other cylinder, respectively, and nozzles attached to said pipes for directing a jet of gases under high pressure into the inflowing and outflowing gases of each cylinder to accelerate their flow and raise their pressure and the in and out flowing volume per time unit.

6. A method for supercharging and for improving the scavenging of internal combustion engines provided with cylinders, with cylinder heads closing the combustion space of the cylinder with intake and exhaust ports, with reciprocating pistons and with intake and exhaust manifolds which consists in conducting gases under combustion pressure from the combustion space of the cylinder to the intake and exhaust manifolds, in converting the pressure into velocity and in injecting the gases at high velocity into the gas-stream moved within the intake and exhaust manifold by the pressures corresponding to the cycle, thus increasing the volume and velocity of the gas charge and of the discharged exhaust gases.

HAROLD E. MATTICE.

REFERENCES CITED

The following references are of record in the file of this patent:

UNITED STATES PATENTS

| Number | Name | Date |
| --- | --- | --- |
| 1,241,999 | Learned | Oct. 2, 1917 |
| 1,250,950 | Bolton | Dec. 25, 1917 |
| 1,314,561 | Wright | Jan. 9, 1923 |
| 1,332,803 | Charlton | Mar. 2, 1920 |
| 1,377,139 | Murphy | May 3, 1921 |
| 1,394,850 | Long | Oct. 25, 1921 |
| 1,441,506 | Hyder | Jan. 9, 1923 |
| 1,477,994 | Buchi | Dec. 18, 1923 |
| 1,697,385 | Deppe | Jan. 1, 1929 |
| 1,831,470 | Sherbondy | Nov. 10, 1931 |
| 2,113,601 | Pratt | Apr. 12, 1938 |

FOREIGN PATENTS

| Number | Country | Date |
| --- | --- | --- |
| 6,288 | England | 1908 |
| 360,351 | Germany | 1922 |
| 449,115 | England | 1936 |